United States Patent Office 3,349,893
Patented Oct. 31, 1967

3,349,893
CONVEYOR BELT
Friedrich Jordan, Wethmar, near Lunen, and Ewald Heuser, Werne an der Lippe, Germany, assignors to Gewerkschaft Eisenhutte Westfalia, Wethmar, near Lunen, Westphalia, Germany, a corporation of Germany
Filed Feb. 2, 1965, Ser. No. 429,847
Claims priority, application Germany, Feb. 20, 1964, G 39,895
7 Claims. (Cl. 198—195)

This invention relates in general to the art of materials handling, and more particularly to a conveyor belt having a plurality of rigid plate sections which are interconnected by flexible, arched joining members to form a continuous belt which can be used for transporting materials up and down steep slopes and around curves.

In general, conveyor belts of this type which provide an accordion-fold type of material transport surface to prevent sliding of materials being conveyed, are known in the prior art. For example, one known conveyor belt of this type is constructed with rigid plate sections disposed at spaced-apart distances from each other and connected to one another by chains which limit the plate separation distances when subjected to tension. Molded rubber joining members which are arched in profile along the transport line are clamp fastened at their marginal ends to adjacent plate sections so as to provide an accordion-fold transport surface.

One of the disadvantages of such prior art conveyor belts lies in the high failure rate of the joining members due to the clamp fastening thereof. When such molded joining members are clamped to the plate sections, they become kinked along the clamp lines, and thereby become subjected to high stresses thereat. Consequently, deterioration of the joining members progressed rapidly at the clamp lines and necessitated frequent replacement of individual joining members.

Another disadvantage of the clamp fastened joining members used in prior art conveyor belts is that they are rather inconvenient to install and replace. Furthermore, the molded rubber joining members, along with the cleats and clamping bolts used to fasten them to the plate sections, and the inherent stress failure problem associated with clamping, made the initial and maintenance cost of such prior art conveyor belts relatively high.

In the conveyor belt according to the instant invention, these disadvantages are overcome by using rigid plate sections having preformed marginal retainer grooves and flat joining members which can be easily bent to provide a periodically arched transport surface and which are provided with marginal beads for insertion into the grooves of adjacent plates. Thus, the need for molded arched joining members is eliminated along with the problems associated with clamping them.

Although some known conveyor belts are constructed with flat rubber belt or slab section joining members, such conveyor belts utilize clamping as a means of fastening the joining members to the plate sections, and thus present the same stress failure problem as in the case of conveyor belts using molded rubber joining members.

With the conveyor belt construction of the instant invention, the rigid plate sections can be either plane or curved to provide a conveyor belt which is trough-shaped lengthwise along the transport line. The retainer grooves of each plate section are open at their ends to permit the beads of the joining members to be slidably inserted therethrough and drawn into said grooves without kinking or twisting. By providing retainer grooves having a profile with a constricted slot opening disposed outwardly at a predetermined angle of inclination with respect to the transport surface side of the plate sections, the joining members are maintained in arched configurations having slopes at the bead portions thereof which are established by the inclination of the retainer groove slots. This particular arrangement provides a means for fastening the joining members to adjacent plate sections which results in relatively low stresses.

The retainer groove profiles are so dimensioned with respect to the joining member bead profiles so that neither clamping nor any other auxiliary fastening means is required. To install a given joining member, it is only necessary to bend it so that its beads are aligned with the adjacent retainer groove ends of a pair of adjacent plate sections, with the flat portions of the joining member adjacent to the beads being aligned so as to pass through the slotted openings of said grooves, and to pull its beads into the grooves either manually, or by any suitable means such as a compressed air cylinder. When a joining member is thus pulled, its beads are drawn narrowed to a certain extent as a result of lengthwise stretching of said beads, thus creating a corresponding clearance between the beads and the walls of said grooves.

In the case of curved plate sections, such as would be used to make a trough-shaped conveyor belt, a joining member which can be made of a flexible, elastic material such as rubber, will be arched in the lengthwise, or transport direction of the belt, and will assume the transverse curvature of the plates, thereby resulting in the creation of locking forces in the flanks of the joining members which clasp the marginal beads thereof in the grooves of the plates. These locking forces are sufficient to secure perfect positioning of the joining members in relation to their respectively adjoining plate sections, even under constant conveyor belt operation. No creeping of the joining members laterally to either side of the conveyor belt as a result of operational stresses and strains need be feared. Furthermore, as a result of the curvature of the grooves in the plates, biases are produced in adjoining members which automatically sustain the upwardly arched shape of same.

Because the joining members are not bent or kinked at their margins, there is relatively little danger of premature failure along these regions. If, nevertheless, for any reason, replacement of a joining member is necessary, the difficulty involved is slight. The joining member to be removed for replacement can be pulled by the same means used to insert it initially into the grooves. It should be noted that pulling forces applied at either side of the conveyor belt result in a slimming of the marginal beads, which in turn automatically draws the beads slightly away from the walls of the retainer grooves which hold them.

As desired or required, the plate sections can be made of steel or of any suitable light weight material such as aluminum or plastic. The plates can be produced by extrusion and then cut to the required length which corresponds to the desired conveyor belt width. The joining members can also be produced advantageously by continuous extrusion, and cut to lengths corresponding to the conveyor belt width.

Where the plates are extruded, extruding dies can be used which directly produce plates of a desired transverse curvature for constructing trough-shaped conveyor belts. However, if desired flat plate extrusions can also be used, and can be bent to the curvature required in the case of trough-shaped conveyor belts.

It is therefore, an object of the invention to provide a conveyor belt comprising alternate rigid plate and flexible arched joining member sections which can be simply interconnected without high stresses.

Another object of the invention is to provide a conveyor belt as aforesaid wherein adjacent plate sections can be interconnected by the arched joining members without clamping.

Another and further object of the invention is to provide a conveyor belt as aforesaid which can be constructed with joining member sections fabricated from flat rubber stock which is sufficiently flexible to be bent transversely into the intended arched configuration of the installed joining member.

Still another and further object of the invention is to provide a conveyor belt as aforesaid which can be constructed with transversely curved plate sections so as to provide a conveyor belt with a trough-shaped transverse profile.

Other and further objects and advantages of the invention will become apparent from the following detailed description and accompanying drawing in which.

Figure 1:
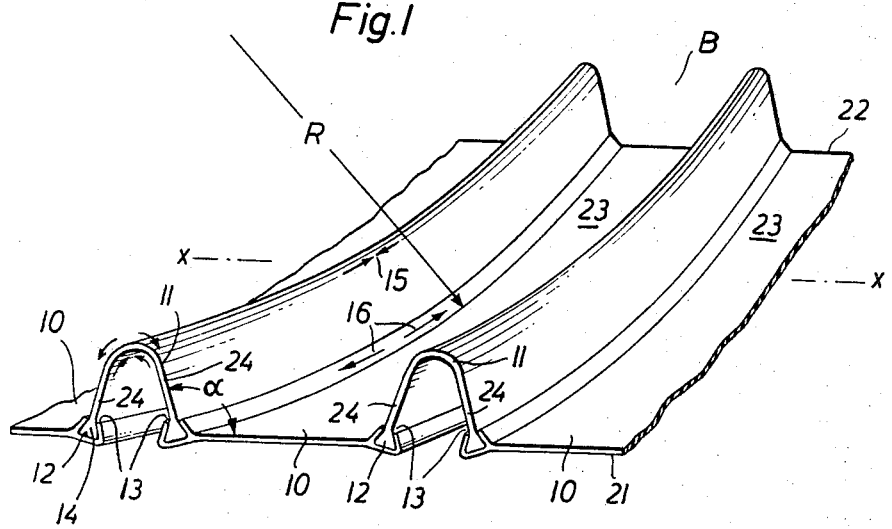
FIG. 1 is a perspective view of a typical portion of a conveyor belt according to a preferred embodiment of the invention.
Figure 2:
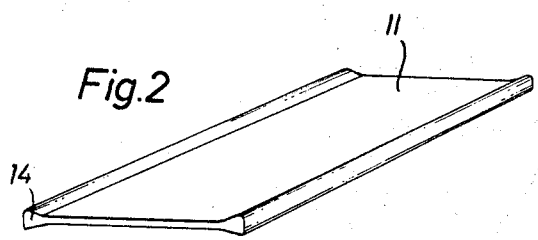
FIG. 2 is a perspective view of a typical flexible joining member in its original form, prior to bending for assembly into the conveyor belt of FIG. 1.

Referring now to FIGS. 1 and 2, the conveyor belt B, according to a preferred embodiment of the invention comprises a plurality of rigid plate sections 10 deposited in endwise and spaced-apart relation to each other with adjacent plates 10 being connected by flexible arched joining members 11. The joining members 11 are attached to plates 10 by inserting their marginal beads 14 into the transverse retainer grooves 12 disposed at each marginal portion of said plates 10.

As can readily be seen in FIG. 1, the grooves 12 extend completely across the plates 10 with substantially uniform profile, and are open at both transverse ends 21 and 22 of said plates 10.

A slotted opening 13 provided in each groove 12, is approximately equal in width to the thickness of the joining members 11, but narrower than the thickness of their beads 14. The profiles of the beads 14 and the grooves 12 are substantially the same.

One pair of grooves 12 is provided on each plate 10, with one groove 12 being disposed at each end marginal portion thereof. The slot openings 13 of the grooves 12 on each plate 10 face outwardly with respect to the transport surface side 23 of the plate 10, with the slots 13 on each plate 10 being disposed at an equal inclination angle $\alpha$ with respect to the transport side 23, and the inclination of the slots 13 on any given plate 10 being oppositely directed with respect to each other. Thus, when the flat joining member 11 of FIG. 2 is bent transversely into the arched configuration shown in FIG. 1 and its beads 14 are inserted into the adjacent grooves 12 of a pair of adjacent plates 10 the slopes of its flanks 24 at the bead 14 portions will be established by the inclination angles $\alpha$ of the slots 13, and will be substantially equal to said angles $\alpha$ when the adjacent plates 10 lie in a common surface.

On any given plate 10, the flanks 24 of the joining members 11 in its grooves 12 are preferably inclined at an obtuse angle $\alpha$ with respect to the transverse side 23, and thus said flanks 24 converge at an acute angle with each other.

By way of example, in FIG. 1 the plates 10 are shown with a transverse curvature with respect to the transport line X—X of the conveyor belt B, so as to provide a trough-shaped belt B for improved material retention. As will be apparent to those skilled in the art, the plates 10 can also be flat. In either case, the flexible joining members 11 when installed in the grooves 12 will assume the transverse curvature of the plates 10. As desired, the transverse curvature of said plates 10 can be arcuate with a constant radius of curvature R, and symmetrical about the transport line X—X, or can be curved in any other fashion, with the exclusion of transverse plate 10 profiles having sharp bends.

By using plates 10 having an approximately constant transverse curvature, insertion of the joining member 11, beads 14 into the grooves 12 is facilitated. This insertion can be performed easily and quickly if the joining membr is pushed at one end while being pulled at the other end and during this insertional movement, the joining member 11 is forced into the transversely curved groove by pressing down upon it approximately at the midpoint of its length. This insertion of the joining members 11 can be performed without the aid of tools. Of course, there is no reason why a jig cannot be used for this assembly operation, such as for example a jig having a recess of appropriate shape and form to force the side portion of the joining member 11 into the desired shape. Such a jig can be constructed so as to engage both its ends around the extremities of the joining member 11 in such a manner that the forces of insertion can be exerted at least partially through said jig.

Also, if desired, a flexible reinforcing member (not shown) such as a cable, can be encased within each of the beads 14, and provided with means such as end sockets (not shown) which can be grasped to facilitate insertion of the joining member 11 beads 14 into the grooves 12, as well as the removal of joining members 11 therefrom.

As a result of the arched profile of the joining members 11 and the curvature of the plates 10 and grooves 12, favorable tensile and compressive forces are produced in the joining members 11. Of particular importance are the transversely directed compressive forces 15 near the apex of the joining member arches and the opposed tensile forces 16 in the beads 14. The stresses and strains resulting from said forces 15 and 16 produce a secure holding of the joining members in their working positions. No additional fastening is necessary, as has been proven in practice. In addition, forces which tend to cause the joining members 11 to bulge outwardly into an arched configuration with respect to the transport sides 23 are maintained during the operation of the conveyor belt B. Thus, the arched joining members 11 will project above the transport surface sides 23 at all times during the operation of the conveyor belt B, therefore assuring a positive entrainment of the material being conveyed, even on upward and downward slopes, or around curves.

As is known in the art, the separation distance of the plate sections 10 can be limited by connecting them one to another via chains, links, etc. (not shown), so that when the conveyor belt B is subjected to tension, a minimum arch height can be maintained for the joining members 11. Otherwise, if the plates 10 were separated to an extent where the joining member 11 arches were flat, the material entrainment capability intended to be provided by the arched configuration of FIG. 1 would be lost.

Another advantageous feature of the conveyor belt B of the instant invention lies in the fact that the bead 14 and groove 12 fastening of the joining members 11 provides forces acting on and within said joining members which cause them to recover their original arched configurations whenever said joining members 11 are temporarily stretched, as when they pass over a driving drum or reversing pulley. Thus, the conveyor belt B construction of the invention prevents the joining member 11 arches from becoming reversed.

As desired or required, in a particular application, the rigid plates 10 can be made of metal such as aluminum, or steel, or plastic, or any other suitable material, and can be extruded with preformed grooves 12, with or without transverse curvature. The joining members 11 are preferably made of an elastic, flexible material such as rubber, and can be molded in a continuous strip which can be cut into lengths corresponding to the width of the conveyor belt B, as also might be done in the case of the plates 10.

Although, as is shown in FIGS. 1 and 2, the plates 10 are substantially rectangular in plan form, and the joining members 11 have a substantially rectangular developed plan form, other suitable plates 10 and joining member 11 shapes may be substituted as desired.

What is claimed is:
1. A conveyor belt which comprises a plurality of rigid plates disposed in endwise spaced-apart relation to each other with adjacent plates being connected by flexible arched joining members extending substantially above said plates and having marginal beads which are inserted into transverse retainer grooves provided in said plates to form a continuous conveyor belt having a transport surface formed of alternating rigid plate and flexible arched member sections.

2. A conveyor belt which comprises a plurality of substantially similar rigid plates connected one to another in succession by at least one chain and displosed in endwise spaced-apart relation to each other with adjacent plates being connected by flexible arched joining members extending substantially above said plates and having marginal beads which are inserted into transversely slotted retainer grooves provided in said plates to form a continuous conveyor belt having a transport surface formed of alternating rigid plate and flexible arched member sections.

3. The conveyor belt according to claim 1 wherein the rigid plates are substantially rectangular in plan form and are curved transversely to the line of transport to provide a trough-shaped conveyor belt.

4. The conveyor belt according to claim 1 wherein each rigid plate is provided with a pair of substantially parallel transverse retainer grooves disposed at opposite end marginal portions of the plate with the slots of said grooves being disposed outwardly at equal but oppositely directed angles of inclination with respect to the transport surface side of the plate.

5. The conveyor belt according to claim 4 wherein the flexible joining members are flat slabs which are bent transversely into an arched configuration with a slope at each marginal bead portion thereof which is established by the inclination of the retainer groove slots.

6. The conveyor belt according to claim 1 including a flexible reinforcing member encased within each of the joining member beads, said reinforcing having means for grasping same provided at each bead end to facilitate insertion of said beads into said grooves, and removal therefrom.

7. The conveyor belt according to claim 1 wherein the joining members are made of rubber.

References Cited

UNITED STATES PATENTS

| 1,422,398 | 7/1922 | Wentz | 198—199 |
| 3,144,123 | 8/1964 | Wiese | 198—149 |
| 3,262,549 | 7/1966 | Stewart | 198—195 |

FOREIGN PATENTS

| 1,099,920 | 2/1961 | Germany. |
| 663,106 | 12/1951 | Great Britain. |

EVON C. BLUNK, *Primary Examiner.*

SAMUEL F. COLEMAN, RICHARD E. AEGERTER,
*Examiners.*